United States Patent
Gordon et al.

(10) Patent No.: US 10,852,830 B2
(45) Date of Patent: Dec. 1, 2020

(54) POWER EFFICIENT, DYNAMIC MANAGEMENT OF HAPTIC MODULE MECHANICAL OFFSET

(71) Applicant: Apple Inc., Cupertino, CA (US)

(72) Inventors: Jonathan A. Gordon, San Jose, CA (US); Matthew Thomas Metzler, San Francisco, CA (US); Adam I. Papamarcos, San Francisco, CA (US); Michael Yiu Ka Diu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/128,478

(22) Filed: Sep. 11, 2018

(65) Prior Publication Data

US 2020/0081537 A1 Mar. 12, 2020

(51) Int. Cl.
*G06F 3/01* (2006.01)
*G06F 3/041* (2006.01)
*G05D 19/02* (2006.01)

(52) U.S. Cl.
CPC ............ *G06F 3/016* (2013.01); *G06F 3/0416* (2013.01); *G05D 19/02* (2013.01)

(58) Field of Classification Search
CPC ........ G06F 3/016; G06F 3/0416; G05D 19/02
See application file for complete search history.

(56) References Cited

U.S. PATENT DOCUMENTS

| | | | |
|---|---|---|---|
| 9,607,491 B1* | 3/2017 | Mortimer | G08B 6/00 |
| 10,409,380 B2* | 9/2019 | Bhatia | G06F 3/016 |
| 2009/0106336 A1* | 4/2009 | Muraki | G06F 7/5443 708/210 |
| 2010/0153845 A1* | 6/2010 | Gregorio | G06F 3/041 715/702 |
| 2011/0190058 A1* | 8/2011 | Houston | A63F 13/285 463/36 |
| 2012/0229264 A1* | 9/2012 | Company Bosch | B06B 1/0253 340/407.1 |
| 2012/0232780 A1* | 9/2012 | Delson | A63F 13/803 701/400 |
| 2012/0249462 A1* | 10/2012 | Flanagan | G06F 1/1694 345/173 |

(Continued)

*Primary Examiner* — Ibrahim A Khan
(74) *Attorney, Agent, or Firm* — Fish & Richardson P.C.

(57) ABSTRACT

In an embodiment, a method comprises: receiving, by a mechanical offset controller, input data; detecting, by the mechanical offset controller, a waveform command in the input data; responsive to the detecting, generating, by the mechanical offset controller, an unparking command; receiving, by a closed-loop controller, the unparking command; and moving, by the closed-loop controller, a mass in a haptic module from a mechanical resting position to a sensor reference position in accordance with the unparking command. The method further comprises: detecting, by the mechanical offset controller, that the input data does not include the waveform command; responsive to the detecting, generating, by the mechanical offset controller, a parking command; receiving, by a closed-loop controller, the parking command; and moving, by the closed-loop controller, the mass in the haptic module from the sensor reference position to the mechanical resting position in accordance with the parking command.

20 Claims, 6 Drawing Sheets

(56) References Cited

U.S. PATENT DOCUMENTS

| | | | | |
|---|---|---|---|---|
| 2012/0272089 A1* | 10/2012 | Hatfield | ............ | G06F 13/4291 |
| | | | | 713/501 |
| 2013/0264973 A1* | 10/2013 | Garg | ................ | H02P 25/032 |
| | | | | 318/130 |
| 2014/0118126 A1* | 5/2014 | Garg | ................ | G06F 3/016 |
| | | | | 340/407.1 |
| 2015/0081110 A1* | 3/2015 | Houston | ............ | G05D 19/02 |
| | | | | 700/280 |
| 2016/0144404 A1* | 5/2016 | Houston | ............ | H02K 7/061 |
| | | | | 318/114 |
| 2016/0258758 A1* | 9/2016 | Houston | ............ | G01C 21/20 |
| 2017/0090574 A1* | 3/2017 | Baer | ................ | G06F 3/016 |
| 2017/0256145 A1* | 9/2017 | Macours | ............ | H04N 5/2257 |
| 2018/0321748 A1* | 11/2018 | Rao | ................ | G06F 3/016 |
| 2019/0384397 A1* | 12/2019 | Cruz-Hernandez | ..... | G06F 3/016 |
| 2019/0385420 A1* | 12/2019 | Khoshkava | ............ | G06F 3/016 |

* cited by examiner

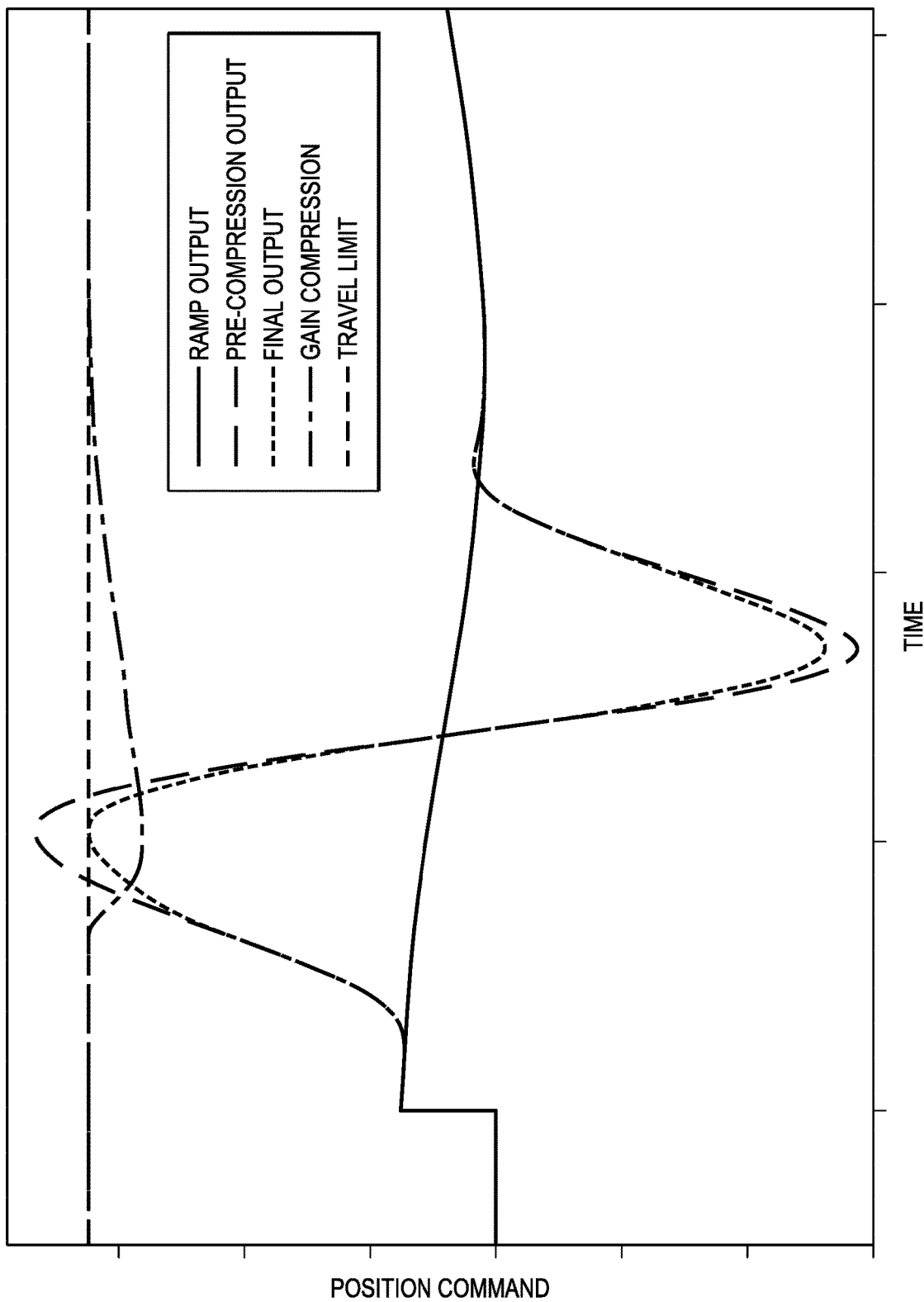

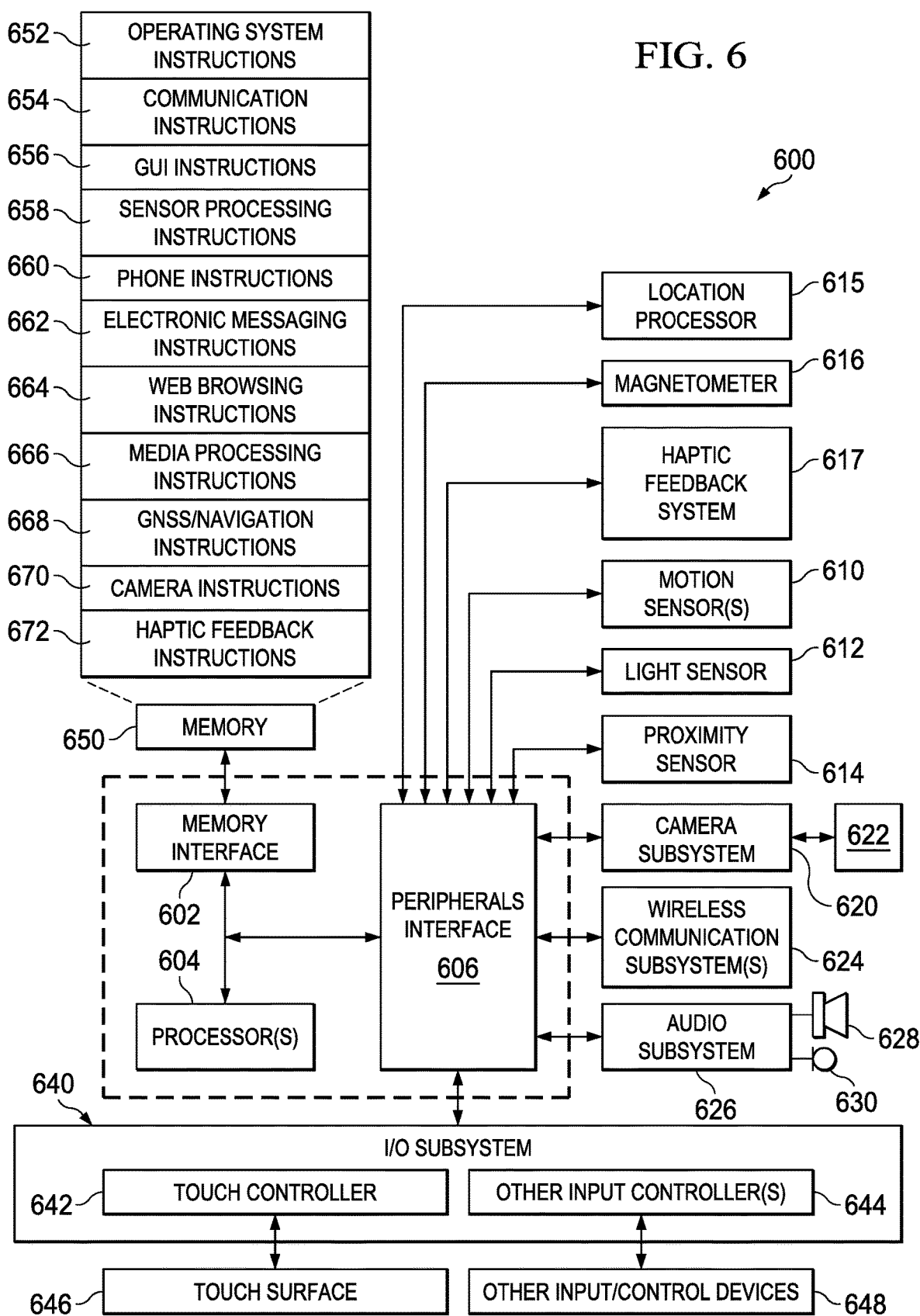

POWER EFFICIENT, DYNAMIC MANAGEMENT OF HAPTIC MODULE MECHANICAL OFFSET

TECHNICAL FIELD

This disclosure relates generally to controlling linear resonant actuators.

BACKGROUND

Some mobile devices (e.g., smart phones) include a haptic module that is configured to provide a tactile sensation such as a vibration to a user touching or holding the mobile device. The haptic module is a linear resonant actuator (LRA) that is connected mechanically to an input surface of the mobile device. Drive electronics coupled to the LRA cause the LRA to induce vibration which is transferred to the input surface so that the vibration can be felt by a user who is touching or holding the mobile device.

SUMMARY

Disclosed is a system, method and apparatus for power efficient, dynamic management of haptic module mechanical offset.

In an embodiment, a method comprises: receiving, by a mechanical offset controller, input data; detecting, by the mechanical offset controller, a waveform command in the input data; responsive to the detecting, generating, by the mechanical offset controller, an unparking command; receiving, by a closed-loop controller, the unparking command; and moving, by the closed-loop controller, a mass in a haptic module from a mechanical resting position to a sensor reference position in accordance with the unparking command. The method further comprises: detecting, by the mechanical offset controller, that the input data does not include the waveform command; responsive to the detecting, generating, by the mechanical offset controller, a parking command; receiving, by a closed-loop controller, the parking command; and moving, by the closed-loop controller, the mass in the haptic module from the sensor reference position to the mechanical resting position in accordance with the parking command.

In an embodiment, a system comprises: a mechanical offset controller configured to: receive input data; detect a waveform command in the input data; generate an unparking command; and a closed-loop controller configured to: receive the unparking command; and move a mass in a haptic module mechanically coupled to the input surface from a mechanical resting position to a sensor reference position in accordance with the unparking command. In an embodiment, the system further comprises: the mechanical offset controller configured to: detect that the input data does not include the waveform command; generate a parking command; the closed-loop controller configured to: receive the parking command; and move the mass in the haptic module from the sensor reference position to the mechanical resting position in accordance with the parking command.

In an embodiment, an electronic device comprises: an input surface; one or more processors; memory storing instructions that when executed by the one or more processors, cause the one or more processors to generate a waveform command; a mechanical offset controller configured to: receive input data; detect the waveform command in the input data; generate an unparking command; and a closed-loop controller configured to: receive the unparking command; move a mass in a haptic module mechanically connected to the input surface from a mechanical resting position to a sensor reference position in accordance with the unparking command; and commanding the haptic module to move the position of the mass in accordance with the waveform command. In an embodiment, the electronic device further comprises: the mechanical offset controller configured to: detect that the input data does not include the waveform command; generate a parking command; the closed-loop controller configured to: receive the parking command; and move the mass in the haptic module from the sensor reference position to the mechanical resting position in accordance with the parking command.

Particular embodiments disclosed herein provide one or more of the following advantages. Dynamic management of mechanical offset in a haptic module reduces power consumption by compensating the mechanical offset only when a waveform is present in a haptic waveform command. During mechanical offset compensation, a closed-loop controller maintains position control of a mass in the haptic module to rapidly unpark and park the mass with reduced residual momentum (reduced "ringing") resulting in imperceptible/inaudible side effects for a user holding a device that includes the haptic module (e.g., a smart phone).

The details of the disclosed implementations are set forth in the accompanying drawings and the description below. Other features, objects and advantages are apparent from the description, drawings and claims.

DESCRIPTION OF DRAWINGS

FIG. 4 illustrates gain compression, according to an embodiment.

FIG. 6 is a diagram of an example mobile device architecture that uses a haptic module as described in reference to FIGS. 1-5, according to an embodiment.

The same reference symbol used in various drawings indicates like elements.

DETAILED DESCRIPTION

Example System

Figure 1A:
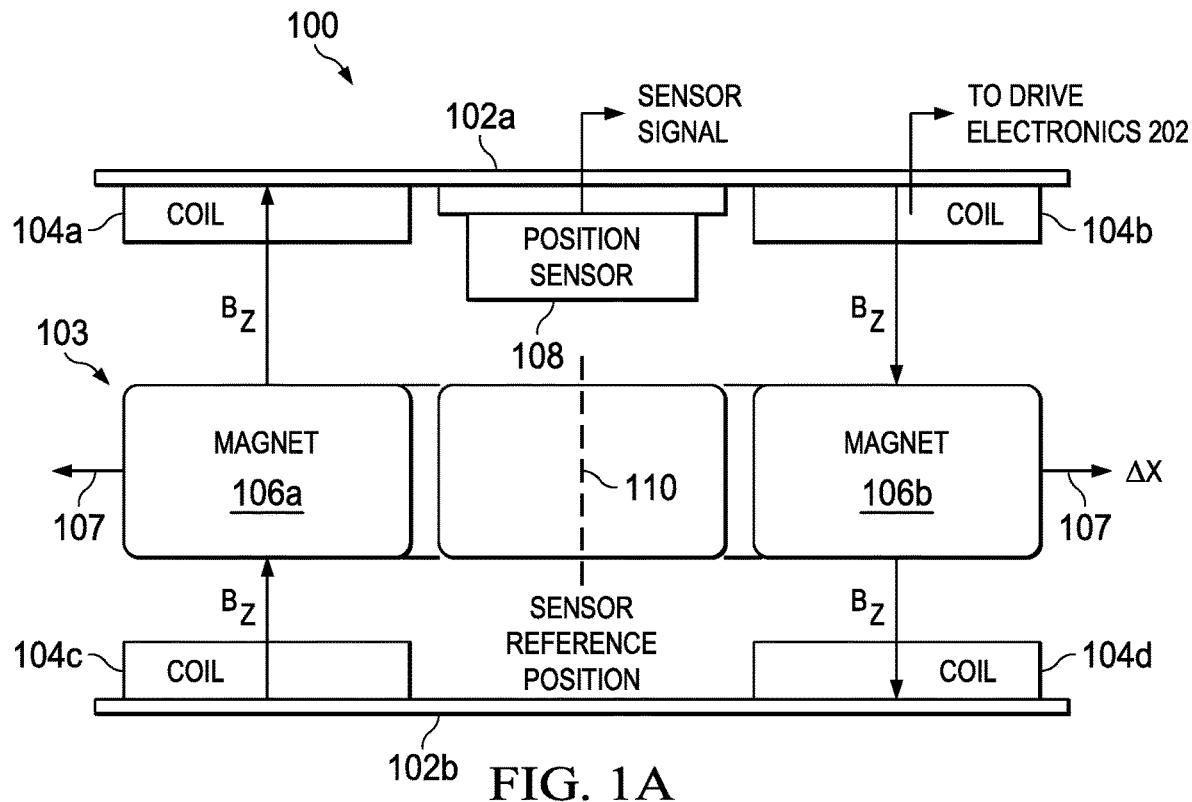
FIG. 1A is a cross-sectional view of an example double-sided, moving magnet LRA, according to an embodiment.

FIG. 1A is a cross-sectional view of an example double-sided, moving magnet LRA 100, according to an embodiment. LRA 100 includes coils 104a-104d mounted to opposing housing portions 102a, 102b. Mass 103 can be mechanically constrained (e.g., constrained by a shaft and/or other mechanical guides or by a stiff suspension using flexures) to move linearly along movement axis 107 (x-axis) in two directions. Mass 103 includes magnets 106a, 106b. Position sensor 108 (e.g., a Hall sensor) is mounted on a flexible printed circuit (FPC) which is attached to portion 102a. Although position sensor 108 is shown mounted to portion 102a (e.g., the top of the housing), in another embodiment position sensor 108 could be mounted to portion 102b (e.g., the bottom of the housing). In another embodiment, there can be two or more opposing position sensors 108 mounted to portions 102a, 102b for controlling z-axis motion of the mass within the housing. Position sensor 108 generates an analog sensor signal (e.g., a voltage signal) that varies in response to a magnetic field in LRA 100.

When LRA 100 is in operation, an alternating current that is provided through coils 104a-104d causes a Lorentz force that drives mass 103 along movement axis 107 in two directions about a magnetic zero reference 110. A position $\Delta x$ of mass 103 on movement axis 107 is a function of the amplitude and frequency of the current flowing through coils 104a-104d. In the example configuration shown, coils 104a-104d and magnets 106a, 106b are used to drive mass 103 along movement axis 107 and the position sensor 108 is used to sense the position of mass 103 on movement axis 107.

Figure 1B:
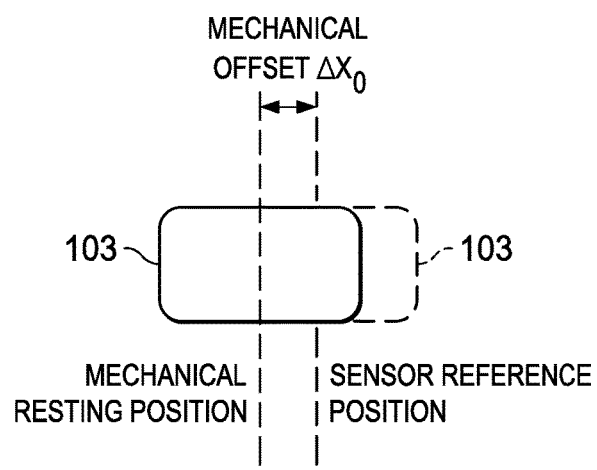
FIG. 1B illustrates mechanical offset in LRA, according to an embodiment.

FIG. 1B illustrates mechanical offset in LRA 100, according to an embodiment. In operation, there is typically a mechanical offset $\Delta X_0$ between a sensor reference position (e.g., 0 Volts) and a mechanical resting position of mass 103. The sensor reference position is the position from which displacement of mass 103 is measured. If the mechanical offset is not compensated then the mass displacement computed from position sensor readings will be inaccurate. To compensate for the mechanical offset, a bias voltage is applied to coils 104a-104d to move mass 300 to the sensor reference position. Moving mass 300 to the sensor reference position allows a closed-loop control system to better control the movement of mass 300 to maximize the travel distance along movement axis 107, and to ensure that the travel distance along movement axis 107 is symmetric on either side of the sensor reference position.

Figure 2A:
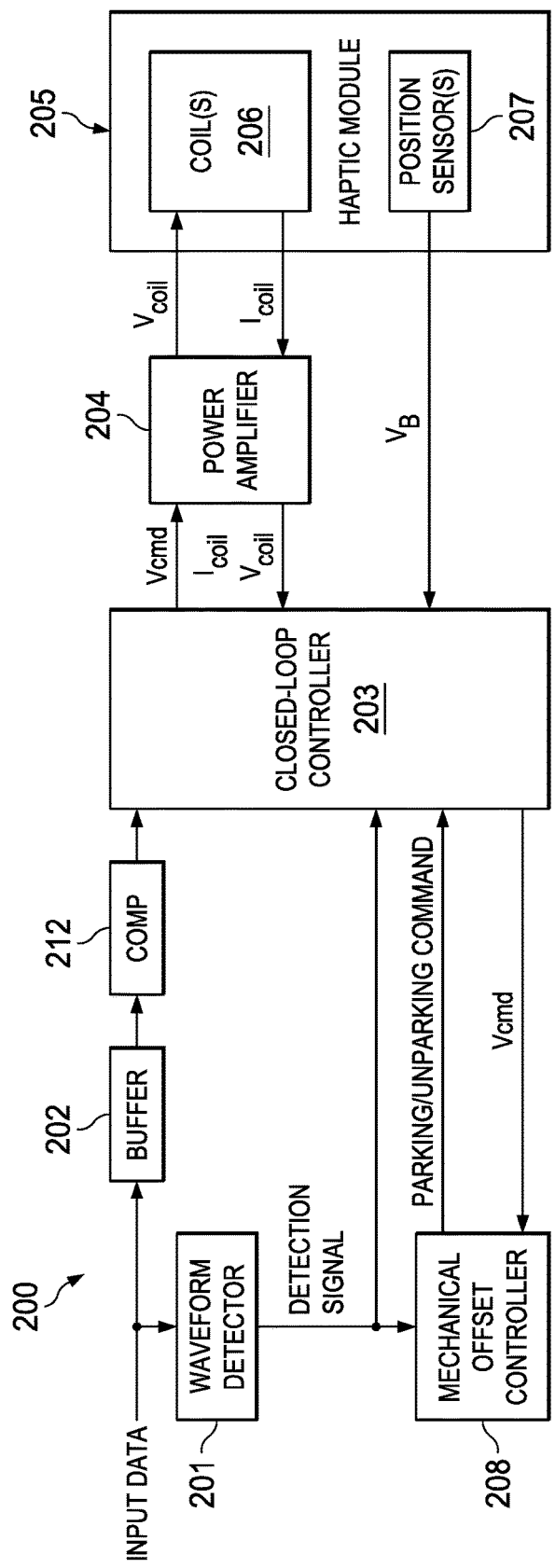
FIG. 2A is a conceptual block diagram of a closed-loop haptic module control system, according to an embodiment.

FIG. 2A is a block diagram of a closed-loop haptic module control system 200, according to an embodiment. System 200 includes waveform detector 201, buffer 202, closed-loop controller 203, power amplifier 204, haptic module 205, mechanical offset controller 208 and soft-clipping gain compressor 212. Haptic module 205 further includes coil(s) 206 and position sensors 207.

System 200 moves a mass of haptic module 205 from its mechanical resting position to its sensor reference position (hereafter referred to as "unparking"), which is unknown ahead of time, and also returns the mass to its mechanical resting position (hereafter referred to as "parking"). System 200 ensures that the DC bias voltage applied to coil(s) 206 is 0 V before turning off power amplifier 204 that is used to drive current into coil(s) 206. Closed-loop controller 203 and mechanical offset controller 208 work together to maintain position control of the mass while unparking/parking to prevent "ringing" and "phantom clicks."

During operation, waveform detector 201 and buffer 202 (e.g., a look-ahead buffer) receive input data. The input data can be generated, for example, by an application processor or any other device. In general, the waveform detector 201 analyzes the input data to determine if haptics are intended by the application processor or other device. In an embodiment, the input data includes digital values (e.g., "1s" and "0s"), and waveform detector 201 samples the input data to detect the presence of a "1" or "0." The detection of a first non-zero value in the input data indicates the presence of a waveform command in the input data, and a waveform detection signal is generated to start the unparking process to move the mass from its mechanical resting position to its sensor reference position. If N consecutive zero samples are detected within a sample period (e.g., 1 millisecond) indicating the absence of a waveform command in the input data, the detection signal is generated to start the parking process to move the mass from its sensor reference position back to its mechanical resting position. In other embodiments, a threshold or moving-average filter can be used to determine if haptics are intended by the application processor or other device.

In an embodiment, closed-loop controller 203 is activated by the detection signal. Closed-loop controller 203 includes a magnetic model that provides a coarse estimate of the mass position $X_{b\_est}$ based on the coil current $I_{coil}$ and the voltage $V_B$ output by the position sensor(s) 207. Closed-loop controller 203 also includes a state-space observer that receives as input $X_{b\_est}$ and outputs a more reliable, higher quality mass position $X_{est}$ and mass velocity $V_{est}$. In an embodiment, the state-space observer is a Kalman filter, which takes as measurements or observations the course estimate of mass position $X_{b\_est}$ and coil current $I_{coil}$. Closed-loop controller 203 also receives a set-point or reference mass position and velocity, and outputs an actuator control voltage ($V_{cmd}$) to power amplifier 204.

Closed-loop controller 203 can implement any desired control law. In an embodiment, controller 203 includes a feedforward component for rapid response and feedback component to compensate for errors in the plant model. An example suitable controller 203 is a proportional-integral-derivative (PID) controller that continuously calculates an error value as the difference between the desired set-point and the measured process variables ($X_{est}$, $V_{est}$).

In an embodiment, $V_{cmd}$ can be a digital command output in pulse code modulation (PCM), pulse width modulation (PWM) or pulse density modulation (PDM). $V_{cmd}$ is used to control the duty-cycle of power amplifier 204. By changing $V_{cmd}$, power amplifier 204 can control how much current is injected into coil(s) 206 and therefore control the movement of the mass in haptic module 205 along movement axis 107, as described in reference to FIG. 1A.

Figure 2B:
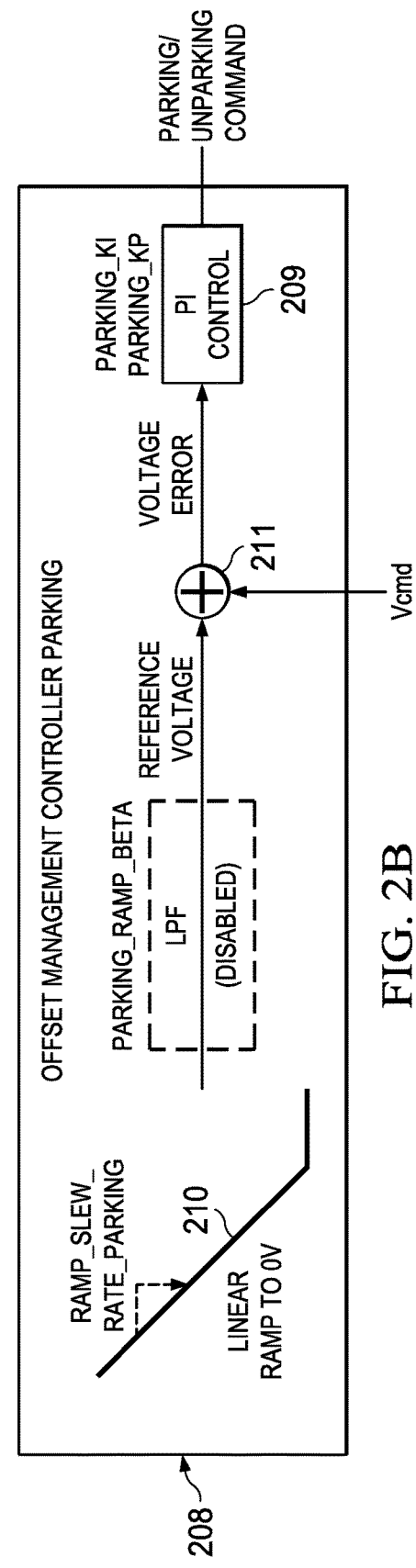
FIG. 2B is a conceptual block diagram of a mechanical offset controller, according to an embodiment.

FIG. 2B is a conceptual block diagram of mechanical offset controller 208 shown in FIG. 2A, according to an embodiment. Mechanical offset controller 208 receives the detection signal from waveform detector 201. In response to the detection signal, mechanical offset controller 208 provides a park command to closed-loop controller 203. In an embodiment, a state machine in closed-loop controller 203 transitions to a parking state in response to the park command, and waits for the moving mass to become motionless, as defined, for example, by a bit in the state-space observer in controller 203. While closed-loop controller 203 is waiting for this condition to be met the waveform command and the park command (described below) are fixed to zero. Once the state-space observer indicates that the mass is motionless, closed-loop controller 203 begins moving the mass towards the mechanical resting position.

The park command generated by mechanical offset controller 208 guides the output voltage of power amplifier 204 with the actuator command voltage $V_{cmd}$. Mechanical offset Controller 208 also uses $V_{cmd}$ as feedback to PI controller 209 to compute a voltage error ($V_{error}$) using adder 211. The voltage error is then used to generate the park command (Ramp[N]) according to Equations [2] and [3]:

$$V_{error}[N]=V_{cmd}[N-1]-V_{ref}[N], \quad [2]$$

$$\text{Ramp}[N]=\text{Ramp}[N-1]+K_p*V_{error}[N-1]+(K_i+K_p)*V_{error}[N], \quad [3]$$

where $K_i$ and $K_p$ are the PI coefficients used in PI controller 209 and can be stored in registers in mechanical offset controller 208. In an embodiment, the reference voltage 210 ($V_{ref}$[N]) is a ramp having a slope determined by a slew rate stored in a register in mechanical offset controller 208.

In an embodiment, closed-loop controller 203 determines that the mass has reached its mechanical resting position and parking is complete if two parking complete conditions are met. The first parking complete condition is that the actuator command voltage $V_{cmd}$ is settled to within a threshold value. The second parking complete condition is that the mass has come to rest or "motionless" as indicated by, for example, a bit in the state-space observer. If both parking complete conditions are met, parking is completed, the state machine of closed-loop controller 203 transitions to a parking exit state and the actuator command voltage output $V_{cmd}$ is muted. In an embodiment, during the first few moments of parking, the parking complete condition is not evaluated for a specified period of time to prevent an accidental parking completion associated with static friction at the beginning of parking.

Figure 3A:
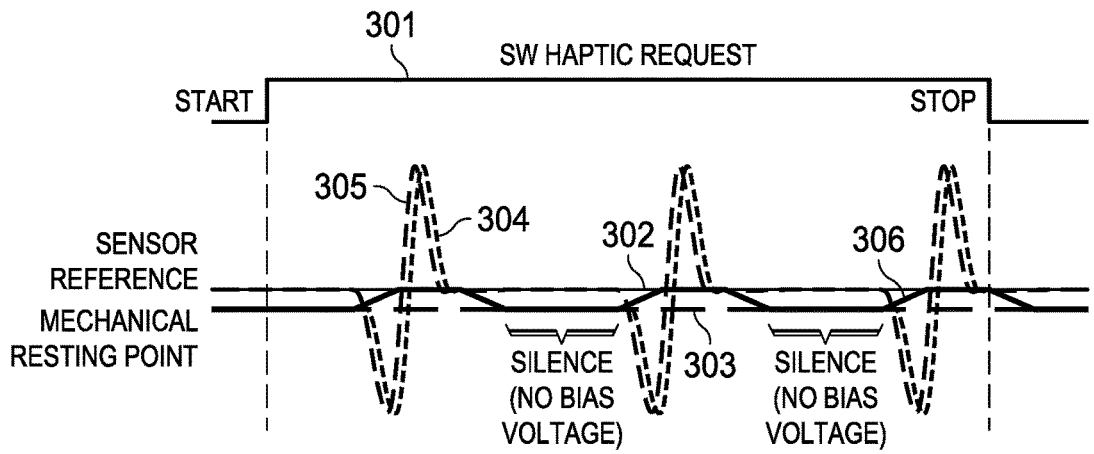
FIG. 3A illustrates compensation of a mechanical offset, according to an embodiment.

FIG. 3A illustrates compensation of a mechanical offset using parking, according to an embodiment. At the top of FIG. 3A is software request signal 301 shown as a pulse with a rising edge (Start) and falling edge (Stop). Software request signal 301 can be provided by, for example, an application processor (AP). Also shown in FIG. 3A is sensor reference position 302, mass position 306, waveform command 304 and park/unpark command 305 (e.g., a bias voltage). On the rising edge of software request command 301, an unpark command 305 is generated and added to waveform command 304 causing mass position 306 to ramp toward sensor reference position 302, where it stays as long as waveform command 304 is present in the input data. When waveform command 304 is not present in the input data, a park command 305 causes mass position 306 to ramp toward mechanical resting position 303. Note that during times of silence (no waveform command present in the input data), unpark/park command 305 is not generated (e.g., no bias voltage), thus reducing power consumption of haptic module 205 during periods of silence.

Figure 3B:
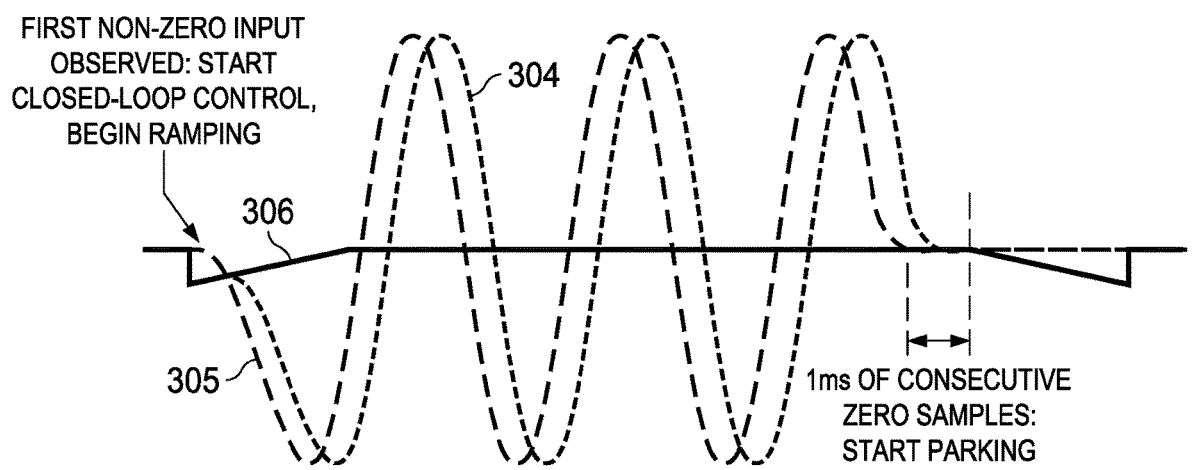
FIG. 3B illustrates compensation of a mechanical offset, according to an embodiment.

FIG. 3B illustrates parking of a haptic module moving mass, according to an embodiment. When the first non-zero sample is detected in the input data, closed-loop controller 203 generates park/unpark command 305 (e.g., a bias voltage), which is added to waveform command 304. This results in mass position 306 moving from mechanical resting position 303 to sensor reference position 302. If N consecutive zero samples within a predefined time window (e.g., 1 ms) are detected in the input data, the parking process is started again and mass position 306 moves from sensor reference position 302 to mechanical resting position 303.

FIG. 4 illustrates gain compression, according to an embodiment. In some scenarios, the park command could generate an actuator command voltage $V_{cmd}$ that causes over-travel of the moving mass in haptic module 205, resulting in the moving mass physically contacting a mechanical stop in haptic module 205. To prevent over-travel, the waveform commands are compressed by soft-clipping gain compressor 212. In an embodiment, gain compressor 212 determines if the waveform commands exceed a threshold value that would result in over-travel. If the threshold value is exceeded, gain compressor 212 reduces the gain (amplitude) of the waveform commands so that the moving mass stays within a travel margin. If the threshold value is not exceeded, gain compressor 212 allows the combined waveform to pass through gain compressor 212 without compression.

Referring to FIG. 4, the vertical axis of the plot shown is the position command (in mm) and the horizontal axis is time (in seconds). The plot shows five waveforms: ramp output, pre-compression output, final output, gain compression and travel limit. Soft-clip gain compressor 212 looks for a maximum value in buffer 202 to determine a worst-case waveform command, such as the largest amplitude. Gain compressor 112 than uses an iterative approach to calculate gain and to check if a previous gain value is with a predefined travel margin. If not within the travel margin, the gain is adjusted to fit within the travel margin. In an embodiment, a low pass filter (LPF) is applied to the gain to prevent sudden changes in velocity and acceleration of the mass.

Example pseudocode for implement gain compressor 212 in software is described below.

```
//Soft-clip Gain Compressor
maxInput = max( buffer ); // Look for the worst-case command in the waveform
        availableMargin = travelLimit – rampOutput; // Calculate how much room is
available for haptic wave
        /*Use iterative approach to calculate gain */
        commandError = maxInput*gain(k–1) – availableMargin; // Check if previous
gain value is within margin
        gain( k ) = gain( k–1 ) – commandError*adaptRate; // Adjust the gain to fit margin
        gain( k ) = LPF( gain( K ) ); // LPF the gain to prevent sudden changes in vel. /
accel.
```

Example Process

Figure 5:
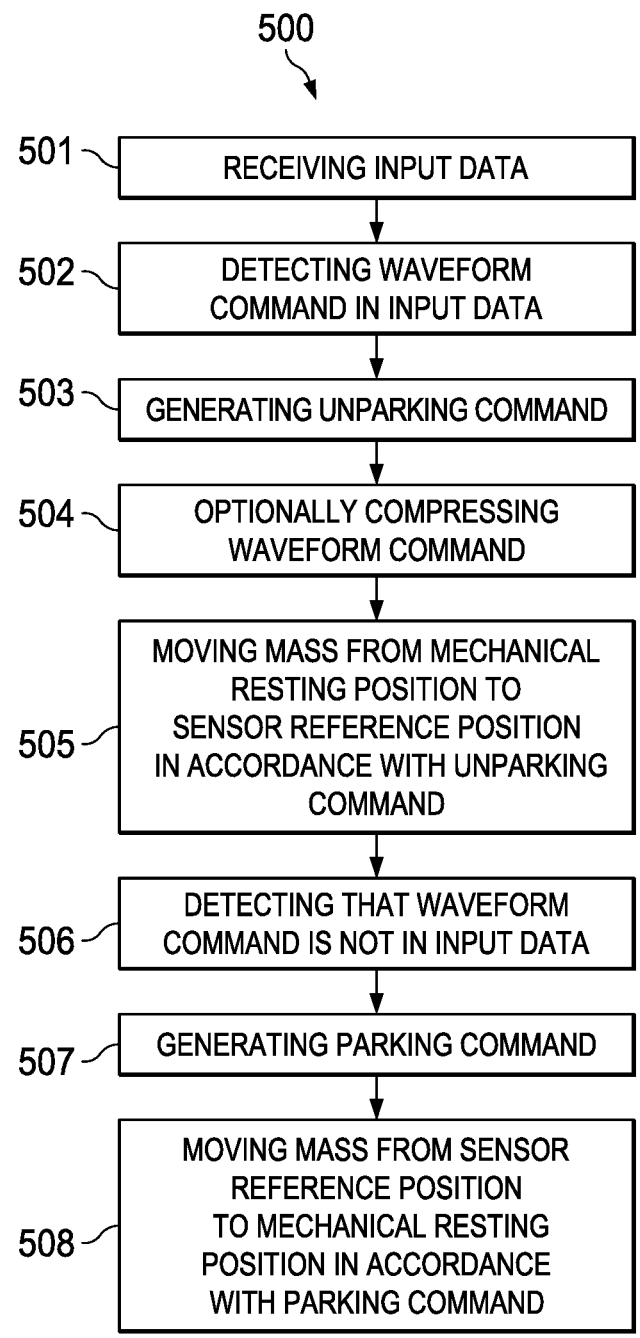
FIG. 5 is a flow diagram of a process of power efficient, dynamic management of haptic module mechanical offset, according to an embodiment.

FIG. 5 is a flow diagram of an example process 500 of dynamic management of haptic module mechanical offset, according to an embodiment. Process 500 can be implemented by, for example, the mobile architecture 600 described in reference to FIG. 6.

Process 500 can begin by receiving input data (501), detecting the presence of a waveform command in the input data (502), generating an unparking command in response to the detection (503), and moving a mass in a haptic module from a mechanical resting position to a sensor reference position (504) in accordance with the unparking command, as described in reference to FIGS. 2 and 3. Optionally, the waveform command is compressed (505) by a soft-clip gain compressor if the gain compressor determines that a travel limit of the mass along the movement axis in the haptic module will be exceeded.

Process 500 continues by detecting that the waveform command is not in the input data (506), generating a parking command (507), and moving the mass from the sensor reference position to the mechanical resting position (508) in accordance with the parking command, as described in reference to FIGS. 2 and 3.

Example Device Architecture

FIG. 6 is a diagram of an example mobile device architecture that uses one of the haptic modules described in reference to FIGS. 1-5, according to an embodiment.

Architecture 600 may be implemented in any mobile device for generating the features and processes described in reference to FIGS. 1-5, including but not limited to smart phones and wearable computers (e.g., smart watches, fitness bands). Architecture 600 may include memory interface 602, data processor(s), image processor(s) or central processing unit(s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functionalities. For example, motion sensor(s) 610, light sensor 612, and proximity sensor 614 may be coupled to peripherals interface 606 to facilitate orientation, lighting, and proximity functions of the device. For example, in some embodiments, light sensor 612 may be utilized to facilitate adjusting the brightness of touch surface 646. In some embodiments, motion sensor(s) 610 (e.g., an accelerometer, rate gyroscope) may be utilized to detect movement and orientation of the device. Accordingly, display objects or media may be presented according to a detected orientation (e.g., portrait or landscape).

Haptic module 617, under the control of haptic module instructions 672, provides the features and performs the processes described in reference to FIGS. 1-5, such as, for example, implementing haptic feedback (e.g., vibration) and parking. Haptic module 617 can include one or more actuators, such as piezoelectric transducers, electromechanical devices, and/or other vibration inducing devices that are mechanically connected to an input surface (e.g., touch surface 646). Drive electronics coupled to the one or more actuators cause the actuators to induce a vibratory response into the input surface, providing a tactile sensation to a user touching or holding the device.

Other sensors may also be connected to peripherals interface 606, such as a temperature sensor, a barometer, a biometric sensor, or other sensing device, to facilitate related functionalities. For example, a biometric sensor can detect fingerprints and monitor heart rate and other fitness parameters.

Location processor 615 (e.g., GNSS receiver chip) may be connected to peripherals interface 606 to provide geo-referencing. Electronic magnetometer 616 (e.g., an integrated circuit chip) may also be connected to peripherals interface 606 to provide data that may be used to determine the direction of magnetic North. Thus, electronic magnetometer 616 may be used to support an electronic compass application.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 624 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 626 may be coupled to a speaker 628 and one or more microphones 630 to facilitate voice-enabled functions, such as voice recognition, voice replication, digital recording, and telephony functions. In an embodiment, audio subsystem includes a digital signal processor (DSP) that performs audio processing, such as implementing codecs. In an embodiment, the audio DSP implements at least some portions of control system 200 described in reference to FIG. 2.

I/O subsystem 640 may include touch controller 642 and/or other input controller(s) 644. Touch controller 642 may be coupled to a touch surface 646. Touch surface 646 and touch controller 642 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 646. In one embodiment, touch surface 646 may display virtual or soft buttons and a virtual keyboard, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some embodiments, device 600 may present recorded audio and/or video files, such as MP3, AAC, and MPEG video files. In some embodiments, device 600 may include the functionality of an MP3 player and may include a pin connector for tethering to other devices. Other input/output and control devices may be used.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, iOS, WINDOWS, or an embedded operating system such as VxWorks. Operating system 652 may include instructions for handling basic system services and for performing hardware dependent tasks. In some embodiments, operating system 652 may include a kernel (e.g., UNIX kernel).

Memory 650 may also store communication instructions 654 to facilitate communicating with one or more additional devices, one or more computers or servers, including peer-to-peer communications. Communication instructions 654 may also be used to select an operational mode or communication medium for use by the device, based on a geographic location (obtained by the GPS/Navigation instructions 668) of the device.

Memory 650 may include graphical user interface instructions 656 to facilitate graphic user interface processing, including a touch model for interpreting touch inputs and gestures; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS (e.g., GPS, GLOSSNAS) and navigation-related processes and functions; camera instructions 670 to facilitate camera-related processes and functions; and haptic module instructions 672 for commanding or controlling haptic module 617 and to provide the features and performing the processes described in reference to FIGS. 1-5.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits (ASICs). Software instructions may be in any suitable programming language, including but not limited to: Objective-C, SWIFT, C # and Java, etc.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, by a mechanical offset controller, first input data;
responsive to not detecting a waveform command in the first input data,
generating, by the mechanical offset controller, a parking command;
receiving, by a closed-loop controller, the parking command;
moving, by the closed-loop controller, a mass in a haptic module from a sensor
reference position to a mechanical resting position in accordance with the parking command, where the sensor reference position is a position from which displacement of the mass is measured and the mechanical resting position is where the mass rests when the closed-loop controller is not maintaining the mass at the sensor reference position;
receiving, by the mechanical offset controller, second input data;
responsive to detecting a waveform command in the second input data,
generating, by the mechanical offset controller, an unparking command;
receiving, by the closed-loop controller, the unparking command; and
moving, by the closed-loop controller, the mass in the haptic module from the mechanical resting position to the sensor reference position in accordance with the unparking command.

2. The method of claim 1, further comprising:
determining, by the mechanical offset controller, that parking is complete when an actuator command voltage is settled to within a threshold value and the mass is motionless, wherein the actuator command voltage is used to control a power amplifier that injects current into one or more coils in the haptic module that generate one or more magnetic fields that cause the mass to move in response to the parking command.

3. The method of claim 1, further comprising:
determining, by the mechanical offset controller, that a travel limit of the mass in the haptic module will be exceeded in response to the parking command; and
compressing, by a compressor, the waveform command.

4. The method of claim 3, wherein compressing the waveform command further comprises:
determining a worst-case waveform command from a plurality of waveform commands stored in a buffer, wherein the worst-case waveform command produces a largest amplitude among the plurality of waveform commands;
computing a gain margin for the worst-case waveform command;
computing a current gain value based on the gain margin;
checking if a previous gain value is within the gain margin; and
adjusting the current gain value to fit the gain margin.

5. The method of claim 4, further comprising:
low-pass filtering the adjusted current gain value.

6. The method of claim 1, wherein detecting the waveform command in the input data, further comprises:
   detecting a first non-zero value in the first input;
   starting the closed-loop controller; and
   generating the unparking command to move the mass from the mechanical resting position to the sensor reference position.

7. The method of claim 6, wherein generating the parking command to move the mass from the sensor reference position to the mechanical resting position, further comprises:
   determining, by the closed-loop controller, that the mass is motionless; and
   moving the mass from the sensor reference position to the mechanical resting position.

8. The method of claim 2, wherein detecting that the input data does not include the waveform command, further comprises:
   detecting a plurality of consecutive zero values in the input data over a time window.

9. The method of claim 1, where at least one of the unparking command or the parking command is a ramping bias voltage.

10. A system comprising:
   a mechanical offset controller configured to:
      receive first input data;
      generate a parking command in response to not detecting a waveform command in the first input data;
      receiving second input data;
      generate an unparking command in response to detecting a waveform command in the second input data;
   a closed-loop controller configured to:
      receive the parking command;
      in accordance with the parking command, move a mass in a haptic module from a sensor reference position to a mechanical resting position, where the sensor reference position is a position from which displacement of the mass is measured and the mechanical resting position is where the mass rests when the closed-loop controller is not maintaining the mass at the sensor reference position;
      receive the unparking command; and
      in accordance with the parking command, move the mass in the haptic module from the mechanical resting position to the sensor reference position.

11. The system of claim 10, wherein the closed-loop controller is further configured to:
   determine that parking is complete when an actuator command voltage is settled to within a threshold value and the mass is motionless, wherein the actuator command voltage is used to control a power amplifier that injects current into one or more coils in the haptic module that generate one or more magnetic fields that cause the mass to move in response to the parking command.

12. The system of claim 10, further comprising:
   the mechanical offset controller configured to:
      determine that a travel limit of the mass in the haptic module will be exceeded in response to the parking command; and
   a compressor configured to compress the waveform command.

13. The system of claim 12, further comprising:
   the system configured to:
      determine a worst-case waveform command from a plurality of waveform commands stored in a buffer, wherein the worst-case waveform command produces a largest amplitude among the plurality of waveform commands;
      compute a gain margin for the worst-case waveform command;
      compute a current gain value based on the gain margin;
      check if a previous gain value is within the gain margin; and
      adjust the current gain value to fit the gain margin.

14. The system of claim 13, further comprising:
   a low-pass filter configured to filter the adjusted current gain value.

15. The system of claim 10, wherein detecting the waveform command in the input data, further comprises:
   detecting a first non-zero value in the first input;
   starting the closed-loop controller; and
   generating the unparking command to move the mass from the mechanical resting position to the sensor reference position.

16. The system of claim 10, wherein the closed-loop controller configured to:
   determine that the mass is motionless; and
   move the mass from the sensor reference position to the mechanical resting position in response to the parking command.

17. The system of claim 10, wherein detecting that the input data does not include the waveform command, further comprises:
   detecting a plurality of consecutive zero values in the input data over a time window.

18. The system of claim 11, where at least one of the unparking command or the parking command is a ramping bias voltage.

19. An electronic device comprising:
   an input surface;
   one or more processors;
   memory storing instructions that when executed by the one or more processors, cause the one or more processors to generate a waveform command;
   a mechanical offset controller configured to:
      receive first input data;
      generate a parking command in response to not detecting the waveform command in the first input data;
      receiving second input data;
      generate an unparking command in response to detecting the waveform command in the second input data;
   a closed-loop controller configured to:
      receive the parking command;
      in accordance with the parking command, move a mass in a haptic module that is mechanically coupled to the input surface from a sensor reference position to a mechanical resting position, where the sensor reference position is a position from which displacement of the mass is measured and the mechanical resting position is where the mass rests when the closed-loop controller is not maintaining the mass at the sensor reference position;
      receive the unparking command; and
   in accordance with the parking command, move the mass in the haptic module from the mechanical resting position to the sensor reference position.

20. The electronic device of claim 19, the closed-loop controller further configured to:
   determine that parking is complete when an actuator command voltage is settled to within a threshold value and the mass is motionless, wherein the actuator command voltage is used to control a power amplifier that injects current into one or more coils in the haptic module that generate one or more magnetic fields that cause the mass to move in response to the parking command.

* * * * *